United States Patent [19]
Kent

[11] Patent Number: 6,163,761
[45] Date of Patent: Dec. 19, 2000

[54] SYSTEM FOR MONITORING AND CONTROLLING PRODUCTION AND METHOD THEREFOR

[75] Inventor: James Thomas Kent, Cincinnati, Ohio

[73] Assignee: Henkel Corporation, Gulph Mills, Pa.

[21] Appl. No.: 08/937,738

[22] Filed: Sep. 25, 1997

Related U.S. Application Data

[63] Continuation of application No. 08/602,172, Feb. 15, 1996, abandoned.

[51] Int. Cl.[7] .............................. G06F 17/40; G01F 15/06
[52] U.S. Cl. ......................... 702/187; 702/127; 702/176; 395/527; 395/701; 707/103
[58] Field of Search .................................... 702/187, 127, 702/176; 345/440, 339, 348, 352; 395/701, 527; 707/103

[56] References Cited

U.S. PATENT DOCUMENTS

| | | | |
|---|---|---|---|
| 3,905,023 | 9/1975 | Perpiglia | 395/182.04 |
| 4,718,025 | 1/1988 | Minor et al. | 702/187 |
| 4,759,123 | 7/1988 | Ohta et al. | 364/468.01 |
| 5,230,065 | 7/1993 | Curley et al. | 395/200.56 |
| 5,402,349 | 3/1995 | Fujita et al. | 364/468.03 |
| 5,430,836 | 7/1995 | Wolf et al. | 345/335 |
| 5,455,945 | 10/1995 | VanderDriff | 364/963 |

*Primary Examiner*—Kamini Shah
*Assistant Examiner*—Hien Vo
*Attorney, Agent, or Firm*—John E. Drach; Rocco S. Barrese

[57] ABSTRACT

An electronic production system and method are capable of handling dynamic process production data. The electronic production system includes a memory; an input/output interface for receiving production data from a plurality of sensors detecting operation of a plurality of processes of a facility; and a processor. The processor includes a plurality of dynamically operating software modules, each responsive to the production data of a respective process for storing and dynamically updating the production data in the memory; an event log generator, responsive to the production data stored in the memory, for generating event logs and for transmitting the event logs to a management system connected to the input/output interface; and a graphic user interface, responsive to the dynamically operating software modules updating the production data, for displaying the production data graphically and dynamically as the production data changes. Improved efficiency and inventory tracking are effected by the electronic production system, as well as vertical integration from processes to the management system of the facility, and horizontal integration of diverse applications.

26 Claims, 11 Drawing Sheets

FIG. 14

SYSTEM FOR MONITORING AND CONTROLLING PRODUCTION AND METHOD THEREFOR

This application is a continuation of U.S. Ser. No. 08/602,172 filed on Feb. 15, 1996 now abandoned.

NOTICE OF COPYRIGHT

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

BACKGROUND INFORMATION

1. Technical Field

This disclosure relates to an automated production system, and in particular to an electronic production system and method for monitoring and controlling production in a facility.

2. Description of the Related Art

Operation of production facilities such as chemical and automotive plants requires production management and accounting on a large scale to attain substantial and consistent quality, to provide economies of scale to improve productivity, and to avoid waste in resources, time, and money.

In facilities employing a multitude of quality and quantity measurements, such as chemical plants in which the amount and type of chemicals produced constitute the inventory of the plant, the coordination, merging, and tracking of processes producing inventory are difficult to attain. Such difficulties may be caused by incompatible production data gathering systems, using, for example, electronic sensors in conjunction with manual readings. Electronic sensors provide improved data gathering, but require supervision and routine calibration.

The tried and true techniques for obtaining manual readings may provide some accuracy, but the procedures for obtaining such readings may be sporadic as well as uneconomical compared to electronic sensors. Data management of such diverse sources of data has been unwieldy in the past.

Other difficulties in inventory management may be caused by incompatible data networking within a facility by the use of different computers and different data formats. Accordingly, the horizontal integration of diverse applications for access of data by an automatic production system has been difficult to achieve.

Some automatic production systems employ a central management system to receive all production data. The incompatible data networking in such a system has prevented effective vertical integration of production data from production processes to the management system of the facility.

Such automatic production systems also use supervisory management systems which are complex to implement and to learn. Some supervisory management systems also find difficulty in handling dynamic process production data.

SUMMARY

It is recognized herein that improved efficiency and inventory tracking may be effected by an automated production system providing vertical integration from production processes to the management system of the facility, as well as providing the horizontal integration of diverse applications with an improved automated production system.

Accuracy in inventory and production information may be attained which is timely and rapidly communicated from production processes to the management system and throughout applications in the facility. In addition, an automated production system which is simpler to implement and to learn improves operation of the facility. The use of dynamic data processing techniques in such automatic production systems also provides the capability of handling dynamic process production data.

An electronic production system and method are disclosed, including a memory; an input/output interface for receiving production data from a plurality of sensors detecting operation of a plurality of processes of a facility; and a processor. The processor includes a plurality of dynamically operating software modules, each responsive to the production data of a respective process for storing and dynamically updating the production data in the memory; an event log generator, responsive to the production data stored in the memory, for generating event logs and for transmitting the event logs to a management system connected to the input/output interface; and a graphic user interface, responsive to the dynamically operating software modules updating the production data, for displaying the production data graphically and dynamically as the production data changes.

Such an electronic production system and method provide for real-time data entry in manufacturing as well as other production processes, and a graphic point-and-click interface allows for ease of use, reduced training time, reduced keyboard entry, and high user acceptance. Easy visual checks and monitoring of processes in diverse departments are also implemented.

BRIEF DESCRIPTION OF THE DRAWINGS

The features of the disclosed electronic production system and method will become more readily apparent and may be better understood by referring to the following detailed description of illustrative embodiments of the present invention, taken in conjunction with the accompanying drawings, in which:

FIG. 14 illustrates a window for changing readings.

DESCRIPTION OF THE PREFERRED EMBODIMENTS

Figure 1:
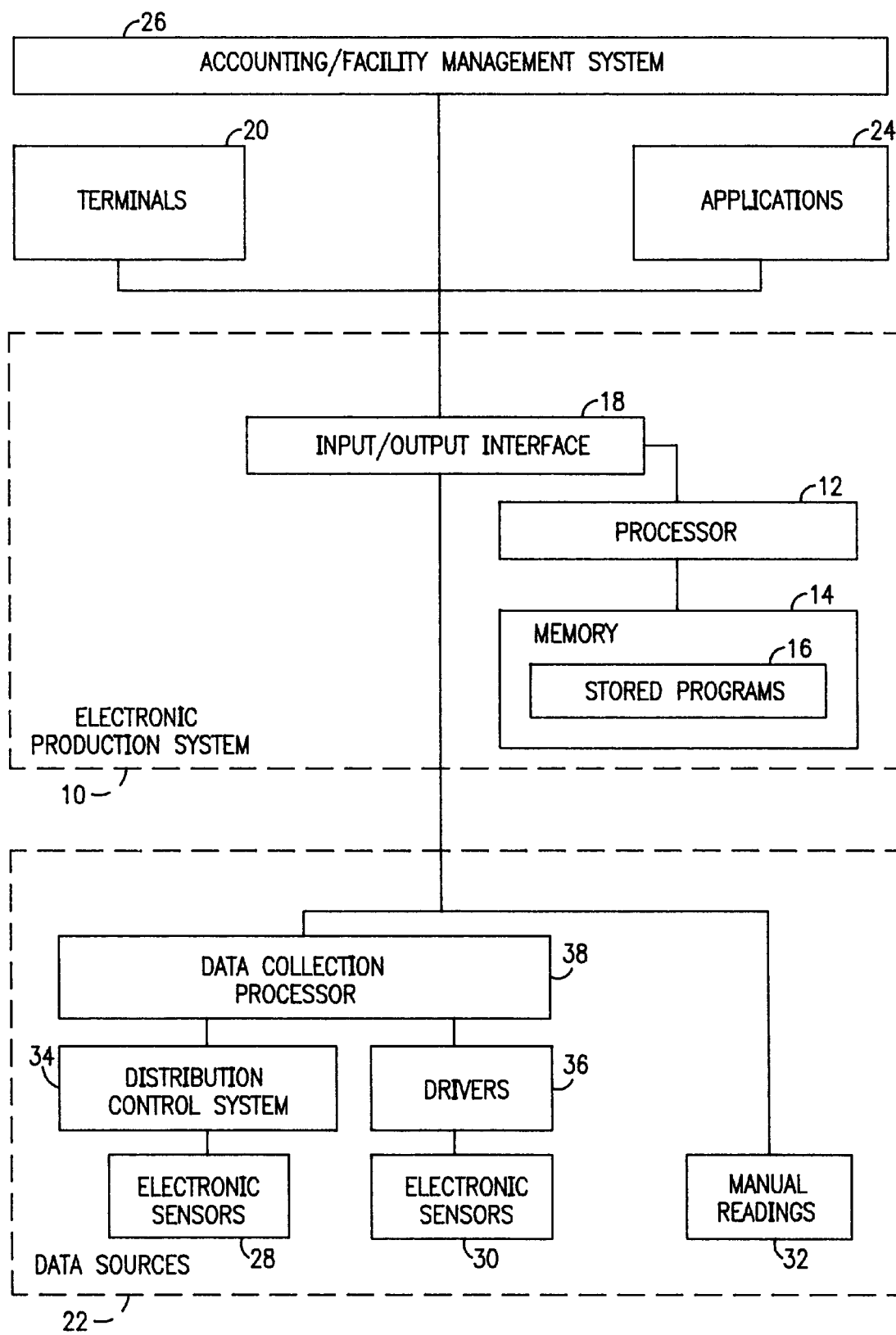
FIG. 1 is a block diagram of the disclosed electronic production system.

Referring now in specific detail to the drawings, with like reference numerals identifying similar or identical elements, as shown in FIG. 1, the present disclosure describes an electronic production system 10 and method for monitoring and controlling production in a facility. The electronic production system 10 includes a processor 12 operatively connected to memory 14 which stores programs 16 including an electronic production program, as described in greater detail below. The processor 12 is also operatively connected to an input/output interface 18, which may include known input devices and output devices.

In an exemplary embodiment, the processor unit 12 is preferably a server operating a "NOVELL" token ring protocol which is operatively connected to a plurality of personal computers as terminals 20, which may be IBM-based personal computers using "INTEL" microprocessors. The electronic production system 10 may run application software as the stored programs 16 to provide programs and subroutines implementing the electronic production system 10 and method.

It is understood that the memory 14, stored programs 16, and input/output interface 18 may be incorporated with the processor 12, in whole or in part, and that the terminals 20 and other components shown in FIG. 1 may be incorporated, in whole or in part, with the electronic production system 10.

Through the input/output interface 18, the processor 12 receives commands and input data from the data sources 22, the applications 24, and the accounting/facility management system 26 for managing and providing information therebetween.

For example, the applications 24 may include programs for providing statistical process control (SPC), for maintaining service requests and failures, for providing on-line documentation, and for providing laboratory information on products tested as being produced within predetermined specifications. Such applications 24 may be off-the-shelf software packages and/or custom-made applications for operating with the electronic production system 10 and method.

The electronic production system 10 and method also operate to interconnect the applications 24 with the other components of the data network of the facility. Accordingly, diverse applications 24 may be horizontally integrated in an applications level of the data network of the facility.

The accounting/facility management system 26 receives the production data in event logs from the electronic production system 10 and method, such as exemplary event logs shown in APPENDIX A, attached and incorporated herein. Such event logs may be generated and stored in a database in the memory 14 (not shown in FIG. 1) and may be correlated with event numbers, recordation dates and times, the specific node for receiving the event log, task designations, transaction times, etc. generated and processed by the electronic production system 10 and method for providing production tracking and reports of the overall production of the facility.

The accounting/facility management system 26 generates an interface file from the event logs received from the electronic production system 10 and method. An exemplary interface file is shown in APPENDIX B, attached and incorporated herein. The interface file may be generated and stored in a database in the memory of the accounting/facility management system 26 (not shown in FIG. 1). Detailed reports of the production of an entire facility may be automatically generated at selected intervals, such as at the end of each month.

The accounting/facility management system 26 may include off-the-shelf software packages and/or custom-made applications. In one embodiment, the accounting/facility management system 26 is a software application known as PRISM which receives such event logs and production data to implement a database including production and inventory histories. PRISM also allows users to edit the data therein for data verification.

The input/output interface 18 includes a keyboard, a mouse, a data reading device such as a disk drive, and/or connections to the data sources 22, which include electronic sensors and/or other data collection devices and mechanisms for providing production data to the electronic production system 10 and method, and thence to the applications 24 and the accounting/facility management system 26.

The electronic production system 10 may accept and process data from, for example, thousands of sources of production data, such as automatic electronic sensors and manually obtained readings. Accordingly, vertical integration is effected from the sources of production data in the facility to data collection devices, terminals 20, and applications 22, and thence to the accounting/facility management system 26. More efficient and accurate production tracking and reporting may thus be performed.

The data sources 22 include a plurality of electronic sensors 28, 30 which automatically receive production data from the facility. For example, in a chemical production facility, the electronic sensors 28, 30 may be positioned within or substantially adjacent to a chemical tank involved in a production process. A production process may include a set of processes, and each tank and component may be considered processes which are monitored by sensors and manual readings.

The electronic sensors 28, 30 measuring and transmitting, for example, the status of the tank as being full, partially full, or empty, as well as the temperature, weight, height of the chemicals in inches from the base of the tank, amount of chemicals removed (i.e. outage amounts), etc. From such data, the amount of production may be determined for each tank.

The data sources 22 may also include manual readings 32 of the various factors described above, such as the temperature, percent capacity, height in inches, etc. for a tank. The manual readings 32 may be collected by a technician at the tank and input to the electronic production system 10 and method through data collection devices, such as terminals 20, including hand-held data input units known in the art. The manual readings 32 may also be input using input data files from storage media such as floppy disks and magnetic tape drives.

In addition, the data sources 22 may also include a distribution control system 34 and drivers 36 for facilitating the collection of production data from the electronic sensors 28, 30. The production data is then collected by a data collection processor 38 which provides the production data to the electronic production system 10 and method in an appropriate format, such as in a database format, for processing by the electronic production system 10 and method. The data collection processor 38 may include a data collection software program for factory automation such as "FIX", available from "INTELLUTIONS".

The distribution control system (DCS) 34 automatically collects the production data from electronic sensors 28 and formats the production data for processing by the distribution control system 34. The drivers 36, which may include hardware and/or software, format the production data from electronic sensors 30 for processing by the distribution control system 34. The drivers 36 may be incorporated, in whole or in part, with the distribution control system 34, or may be implemented independently as needed.

The distribution control system 34 transmits the production data to the electronic production system 10 and method, which may store the received production data in memory 16 for further processing. In one embodiment, the electronic production system 10 receives ASCII signals embodying production data from any source.

Using the electronic production system 10 and method, employees at a facility may access the data collected from the tanks using the terminals 20 providing a graphic user interface (GUI) to efficiently manage and supervise the production at the facility. The terminals 20 may include a keyboard, mouse, and/or a display for providing the graphic user interface to the electronic production system 10 and method. In one embodiment, the graphic user interface is a "WINDOWS" environment which may be generated by "VISUAL BASIC", available from "MICROSOFT".

The electronic production system 10 and method performs application programs and subroutines, described hereinbelow in conjunction with FIGS. 2–14, as the electronic production program which is implemented from compiled source code in the "VISUAL BASIC" programming language. An illustrative embodiment of the source code of the electronic production system 10 and method is provided in APPENDIX C, attached and incorporated herein. It is understood that one skilled in the art would be able to use other programming languages such as C++ to implement the electronic production system 10 and method.

For clarity of explanation, the illustrative embodiments of the electronic production system 10 and method are presented as having individual functional blocks, which may include functional blocks labelled as "processor" and "processing unit". The functions represented by these blocks may be provided through the use of either shared or dedicated hardware, including, but not limited to, hardware capable of executing software. For example, the functions of the processor and processing unit presented herein may be provided by a shared processor or by a plurality of individual processors.

Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

Figure 2:
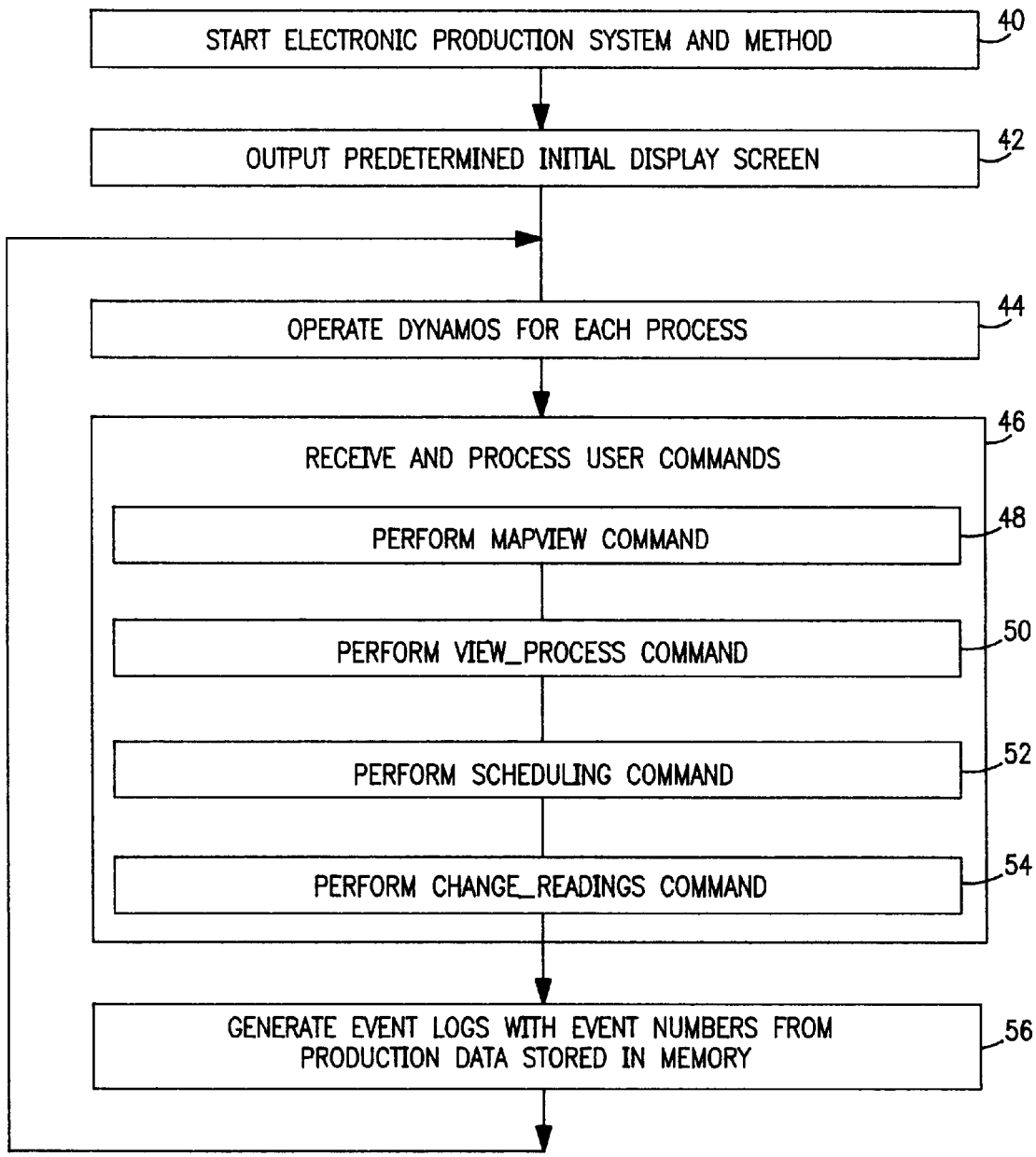
FIG. 2 is a flowchart of the method of operation of the disclosed electronic production system.

As shown in FIG. 2, the disclose electronic production system 10 operates by starting in step 40; outputting an initial display screen in step 42; and operating dynamos for each process, as described in greater detail below, in step 44 concurrently with the receiving and processing of user commands in step 46. Upon receiving a user command, the electronic production system 10 processes the command, for example, to perform a MAPVIEW command in step 48; to perform a VIEW_PROCESS command in step 50; to perform a scheduling command in step 52; and/or to perform a CHANGE_READINGS command in step 54.

After processing each command, the electronic production system 10 may generate an event log in step 56 for a set of events from the production data stored in memory 14, such as events involving active processes occurring within a predetermined time period. The event log is associated with a corresponding event number, and is sent to the accounting/facility management system 26 at predetermined intervals.

The electronic production system 10 then loops back to continue operating the dynamos in step 40 and receiving and processing user commands in step 42.

The step of starting the electronic production system 10 and method includes accessing the electronic production system 10 by a user at one of terminals 20. Access to the electronic production system 10 may be restricted to, for example, supervisors and officials at the facility using passwords or other security measures.

Figure 3:
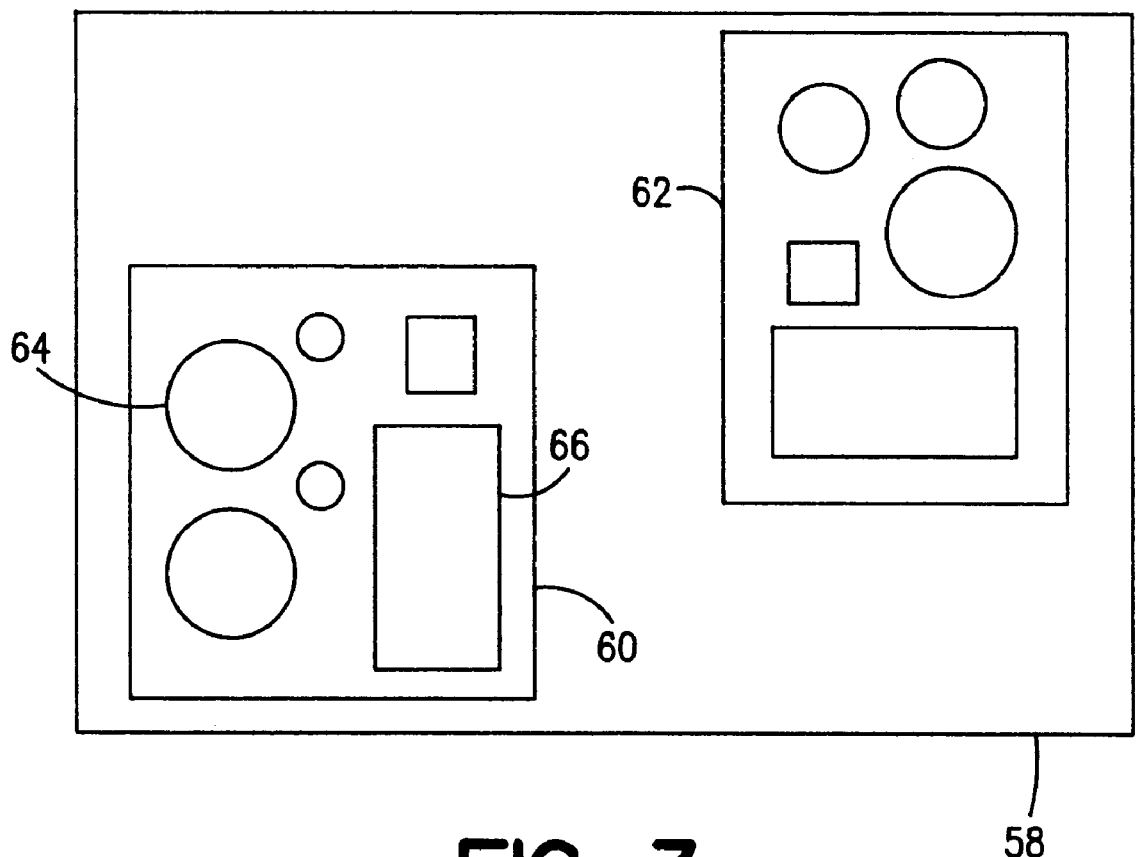
FIG. 3 illustrates a schematic of a facility.

Upon being accessed through a terminal 20, the electronic production system 10 outputs the predetermined initial display screen in step 42. In an illustrative embodiment, the initial display screen may show a schematic 58 of the layout of the facility, as shown in FIG. 3, which may include a plurality of regions 60–62 in the facility in which sets of processes are conducted. The displayed schematic 58 may depict the facility with sufficient accuracy, including chemical process tanks 64 and administrative buildings 66, to facilitate the selection of processes in the facility to be monitored.

Upon access by the user and after the initial display screen 58 is displayed, the electronic production system 10 operates dynamos for each process in step 44. A dynamo is herein defined to be a software module or object which represents a component of the facility. Such dynamos may also be implemented using object orient programming. The dynamos may reside and operate, in whole or in part, in the memory 14 for operation by the processor 12 and may be stored as a part of the stored programs 16.

In an illustrative embodiment, the tank 64 in region 60 shown in FIG. 3 is represented by a dynamo which polls and/or receives tank production data from the sensors monitoring the tank 64. For example, sensors measuring the pounds and the height of the chemicals in the tank 64 may be sent to the dynamo of tank 64.

Each dynamo transmits its corresponding production data to the electronic production system 10 for processing, so the operation of the dynamo is concurrent with the other operations of the electronic production system 10; for example, in receiving and processing user commands.

Figure 4:
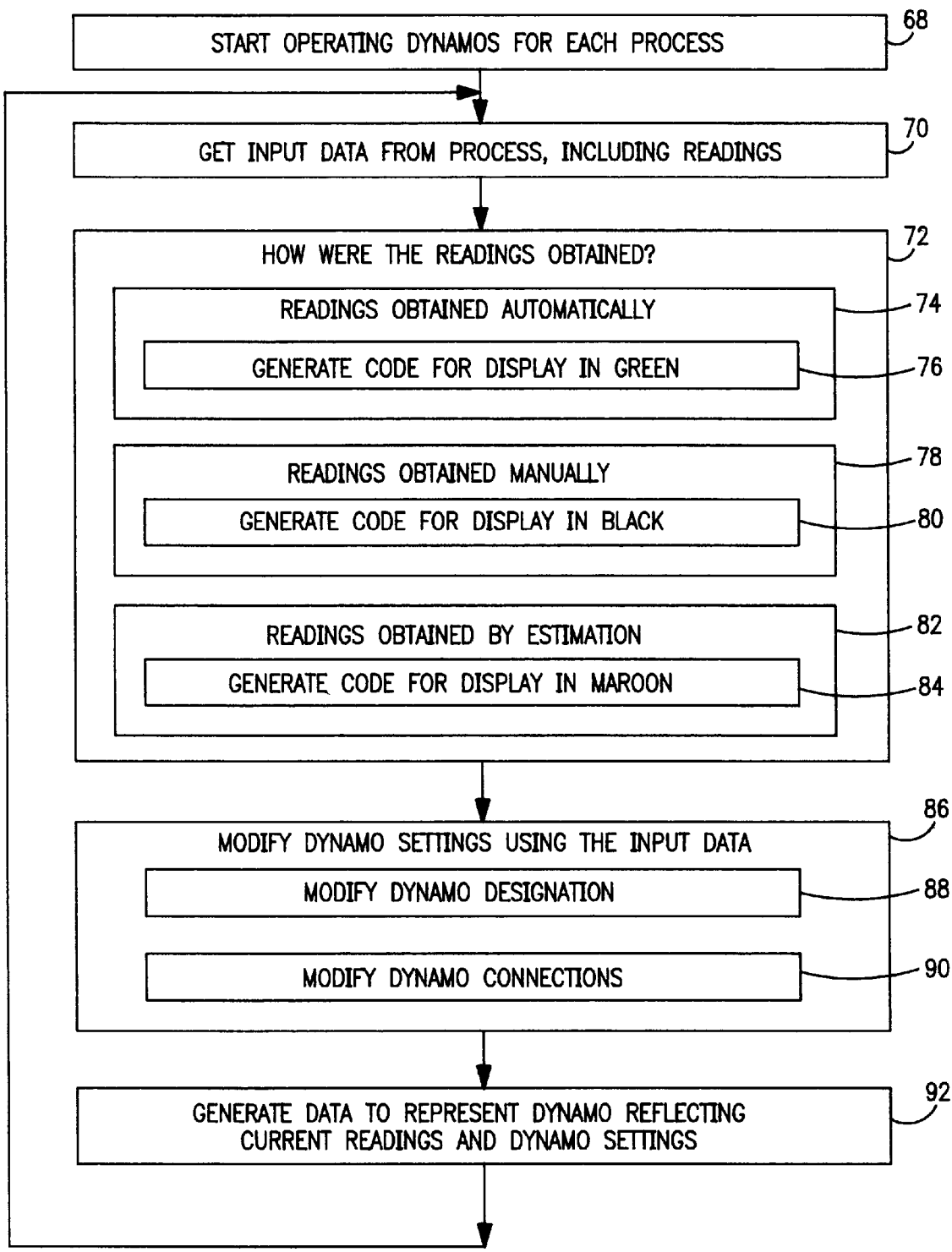
FIG. 4 is a flowchart of operation of a dynamo software module.

As shown in FIG. 4, the electronic production system 10 starts operating the dynamos for each process in step 68; receives input data from the process in step 70, including readings from the corresponding electronic sensors and/or the manually obtained and inputted readings; and then processes the readings for display in step 72 according to how the readings were obtained.

If the readings were obtained automatically in step 74, for example, from the electronic sensors, a code is generated for displaying such readings in green in step 76. If the readings were obtained manually in step 78, for example, from a technician making a manual measurement at a tank, a code is generated for displaying such readings in black in step 80.

If the readings were obtained by an estimate in step 82, for example, by a supervisor monitoring the tank through the electronic production system 10 and inputting an estimate, or alternatively inputting a temporary value for a reading for analysis, a code is generated for displaying such readings in maroon in step 84. The use of such displayed colors for readings facilitates the monitoring of the tanks to determine how the readings were obtained.

The electronic production system 10 then allows a user to modify the setting of each dynamo in step 86, which may include modifying a dynamo's designation in step 88 or modifying a dynamo's connections with other dynamos or processes in step 90. The electronic production system 10 then generates data in step 92 representing each dynamo and reflecting the current readings and settings associated with each dynamo, and the electronic production system 10 loops back to step 70 to get input data for each process.

Each dynamo includes a plurality of settings and labels, which may be modified by the user, for determining its function in a process. For example, a dynamo may represent a tank designated E51, which stores a chemical labelled 0-PFA. In an illustrative embodiment, the dynamos may also be graphically displayed to visually represent processes, as discussed below in reference to FIG. 7, and so may be graphically changed and interconnected in processes. The current reading may also be displayed substantially adjacent to an icon representing the tank and associated dynamo.

As the dynamos are operating and updating the readings of the processes, the electronic production system 10 may receive and process user commands in step 46 of FIG. 2. For example, if the MAPVIEW is not initially displayed, or if the user wants to redisplay the MAPVIEW after having viewed a current screen, the user may enter a MAPVIEW command.

Figure 5:
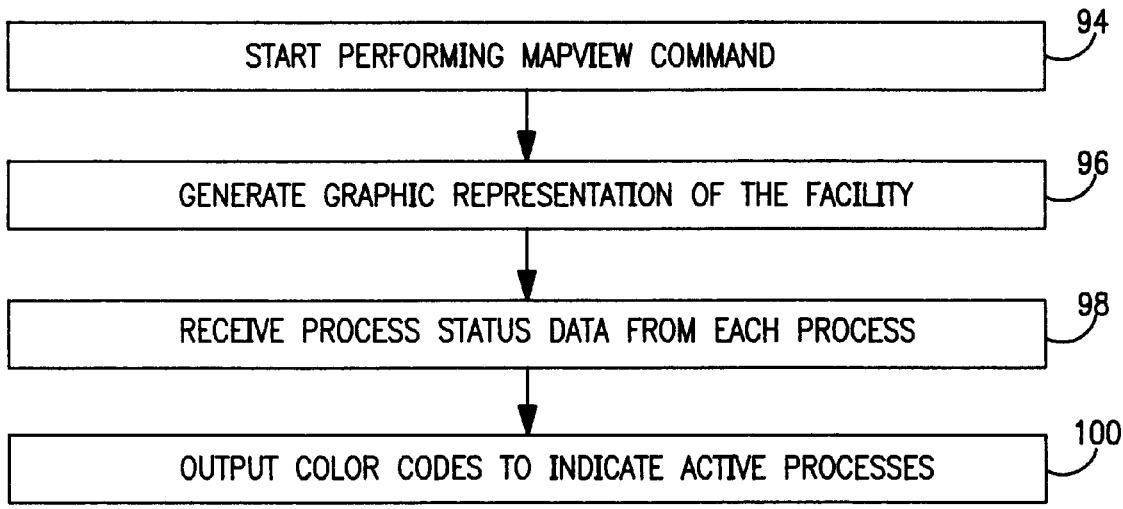
FIG. 5 is a flowchart for displaying a graphic of a map of a facility.

As shown in FIG. 5, the electronic production system 10 starts performing the MAPVIEW command in step 94; and generates a graphic representation of the facility in step 96 by retrieving graphics data from the memory 14, such as bitmapped graphics. The electronic production system 10 may optionally receive process status data from each process in step 98; i.e. data indicating that a specific process is currently active or in progress. The electronic production system 10 may then output color codes in step 100 to indicate which processes are active. As the processes are generally associated with specific equipment or components of the facility, such equipment or components may be highlighted or otherwise color indicated as active.

For example, the schematic 58 may be a black and white line drawing, and active processes may be colored, for example, yellow on a color monitor of a user's terminal 20. For example, as shown in FIG. 3, the region 60 on the display may have a yellow border, or have the background color changed from white to yellow.

To select a specific process to be monitored, the user may choose one region 60 to be accessed in greater detail by clicking on the region 60 using a mouse, which activates a VIEW_PROCESS command. In particular, the user may choose a color highlighted region as an active process to monitor. Alternatively, inactive processes may also be viewed; for example, inactive processes may include tanks and other components with chemicals stored therein, which may have current readings capable of being accessed by the user through the electronic production system 10.

Figure 6:
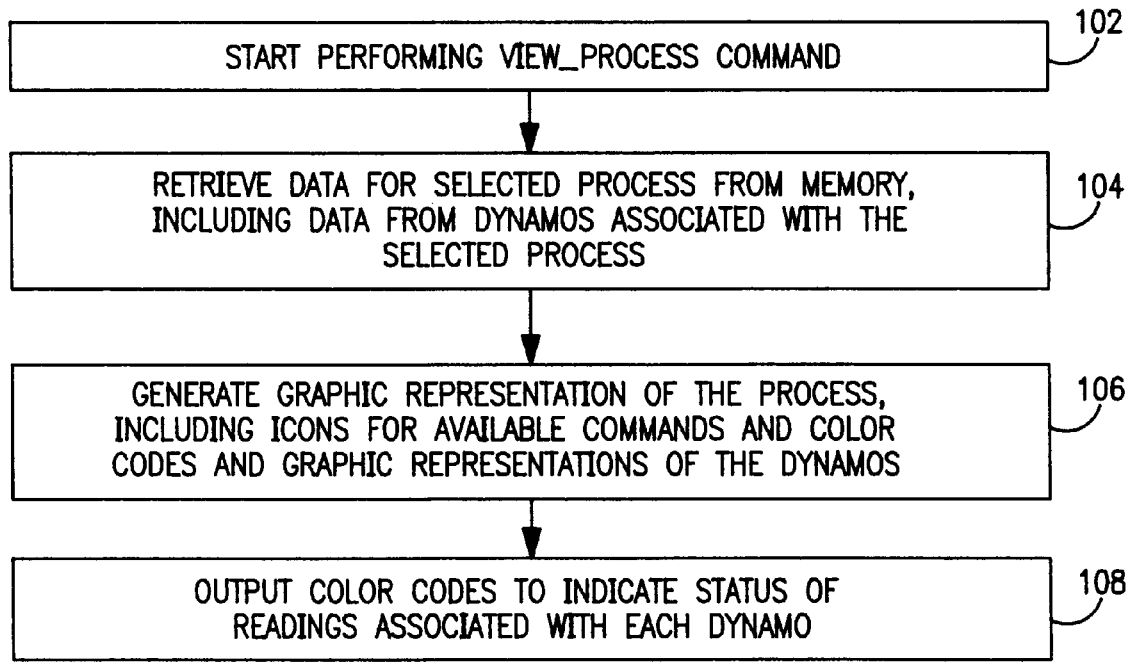
FIG. 6 is a flowchart for viewing a process with dynamically changing icons.

As shown in FIG. 6, the electronic production system 10 starts the VIEW_PROCESS command in step 102; retrieves data in step 104 for the selected process from memory 14, including data from dynamos associated with the selected process; and generates a graphic representation of the process in step 106, including icons for available commands, color codes and graphic representations of the dynamos. The electronic production system 10 then outputs color codes in step 108 to indicate status of readings associated with each dynamo.

Figure 7:
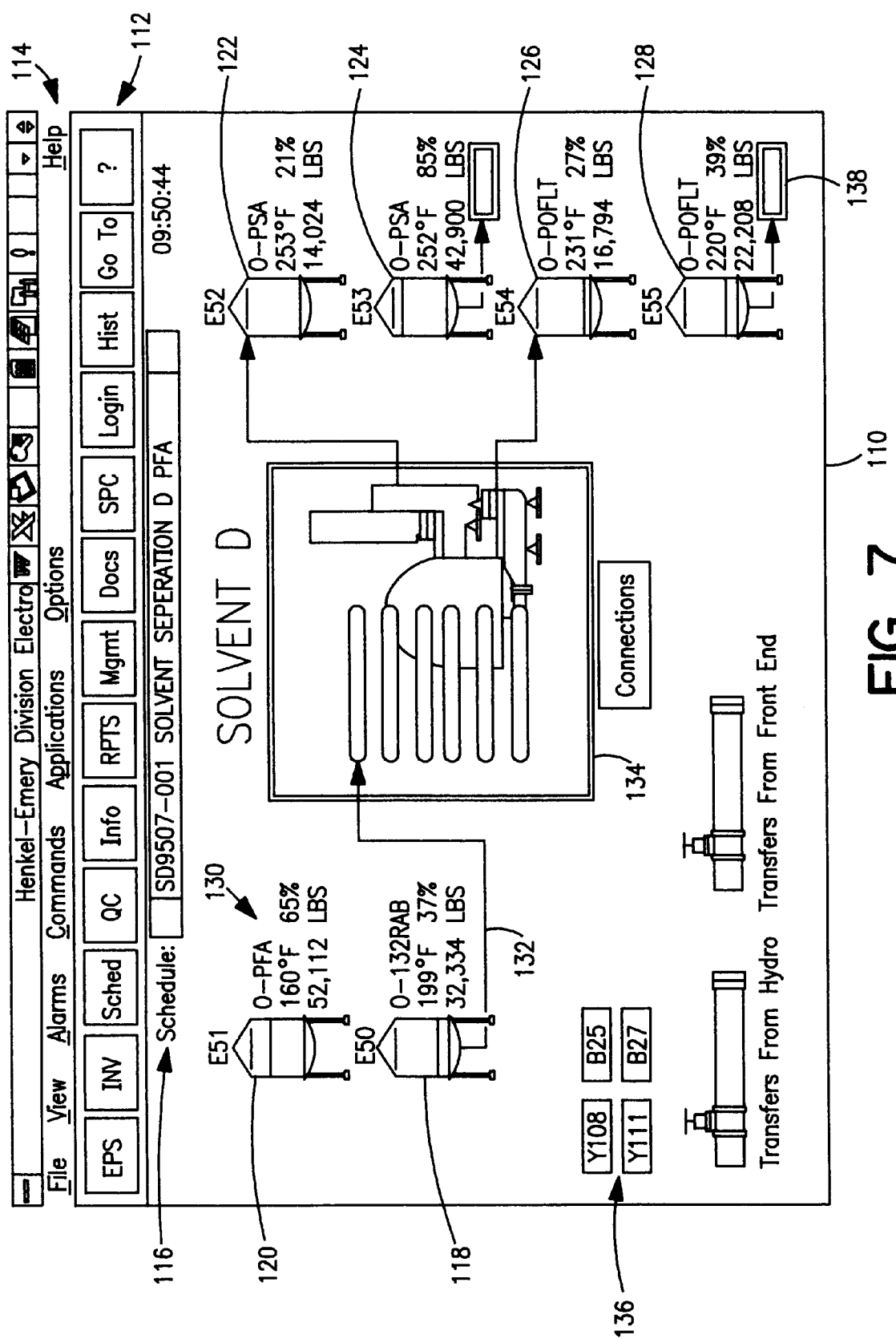
FIG. 7 illustrates a window for viewing the process with dynamically changing icons.

In an illustrative embodiment, a VIEW_PROCESS window 110 is shown in FIG. 7 which is generated by the method in FIG. 6. In FIG. 7, icons 112 and labels 114 for available commands are displayed, as well as other information about the selected process, such as the operating schedule 116 for the selected process.

Using icons 112, the user may access and easily navigate through the electronic production system (EPS) 10, the current inventory database (INV), a database of schedules (Sched) of the facility and the various processes, and a Quality Control (QC) application. A reports generator (RPTS), an on-line documentation service (Docs) of the electronic production system 10, and the statistical process control (SPC) program may also be accessed through the window 110. Other departments and applications may be accessed through the GOTO icon, and the "?" icon provides access to help menus, legends regarding the screens, and news of the facility.

Icons 118–128 represent tanks designated E50–E55, respectively, and associated readings are displayed substantially adjacent the corresponding tank icon. As discussed above in reference to FIG. 3, the readings are updated by associated dynamos.

For example, tank 120 labelled E51 may include readings 130 indicating the contents to be a chemical designated O-PFA, having a temperature of 160° F. being at 65% capacity, and having its contents weigh 52,112 lbs. Such information is provided by the associated dynamo, and may be color indicated. For example, the weight of 52,112 may be colored green (not shown in FIG. 7), indicating that this measurement was obtained automatically.

In addition, the appearance of the icons 118–128 may be changed by their respective dynamos; for example, the contents of tank E50 has an icon showing 37% capacity. Window 110 also shows a connection 132 for pumping the contents to a chemical processor 134, so the capacity of tank E50 should decrease, and the dynamo for tank E50 will then change the icon 118 to another icon indicating less capacity. Such dynamic information is readily accessible through the electronic production system 10 for improved monitoring of the production of the facility, for example, the pumpings into and out of tanks and chemical processors, and the current state of each tank. According, the operation of such pumping into processes and corresponding tank levels is represented concurrently as such operation is reported to the electronic production system 10.

FIG. 7 also illustrates icons 136, 138 which designate other tanks or components involved in the illustrated process that are not shown in greater detail due to space limitations on the display of the terminal 20. Upon activation by the user by selection and activation by clicking a mouse, these icons 136, 138 are replaced by corresponding graphic representations of the associated tanks or components.

Each process and its associated tanks and components are predetermined by a schedule which is established in advance to provide efficient production throughout the facility. In this manner, each process displayed on a VIEW_PROCESS window 110 has a predetermined schedule 116 for its operation.

Figure 8:
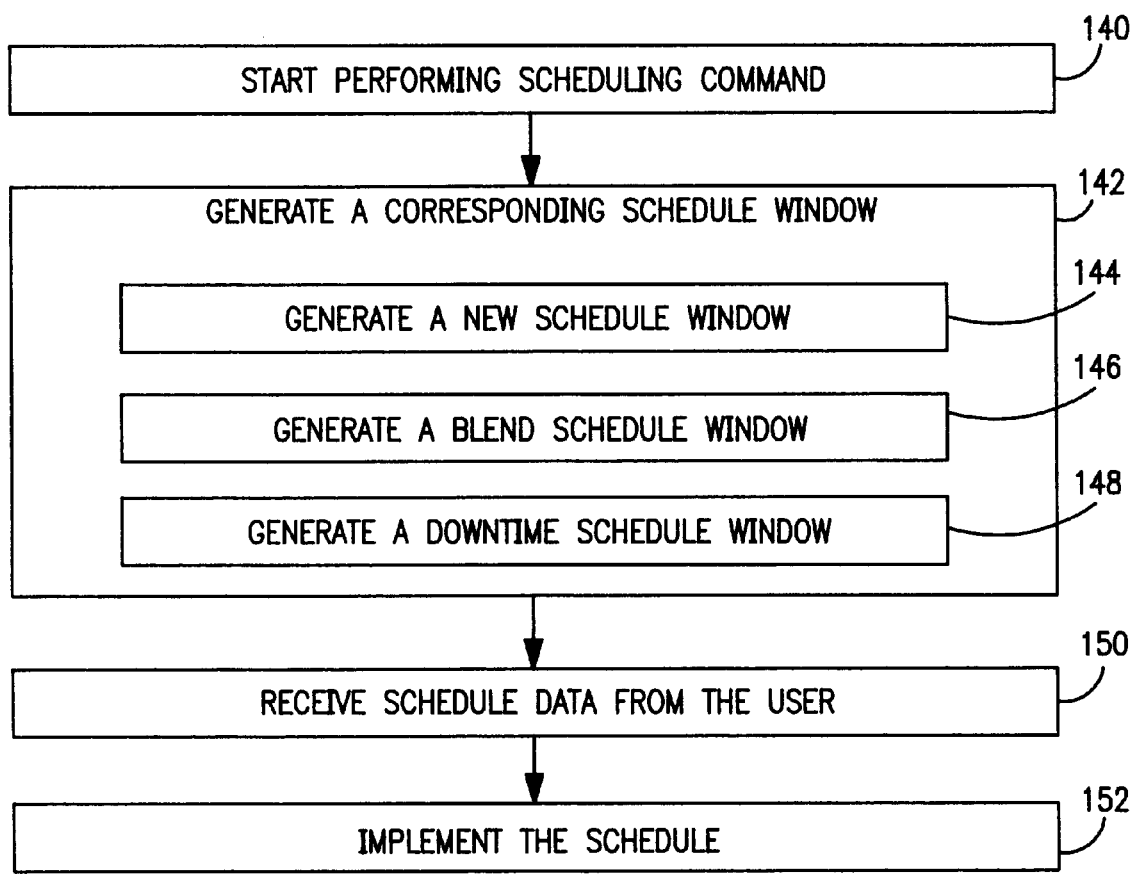
FIG. 8 is a flowchart for entering production schedules.
Figure 9:
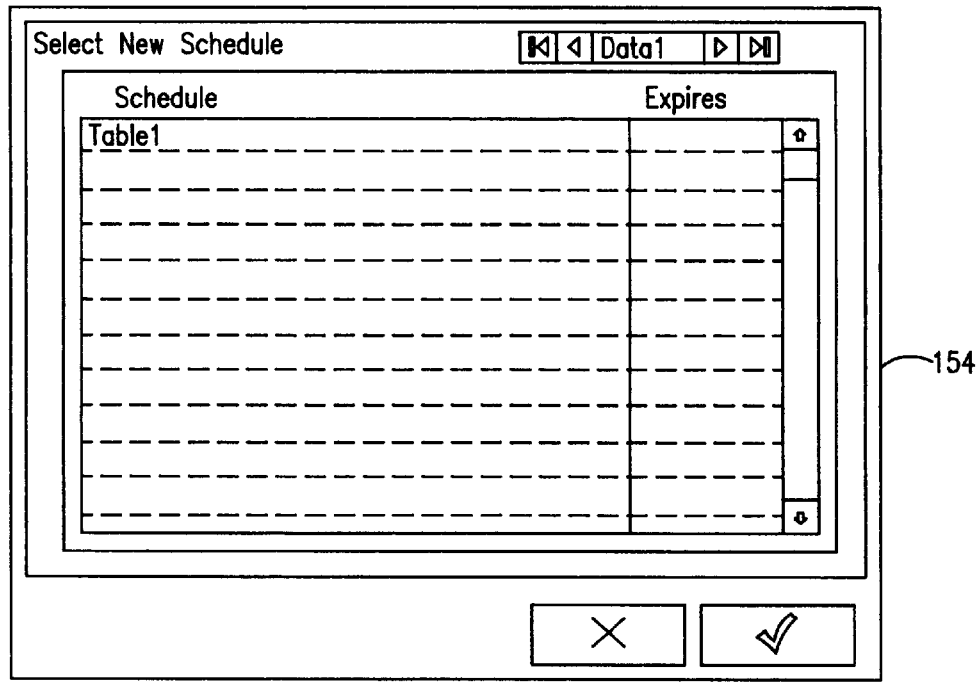
FIG. 9 illustrates a window for inputting new schedules.
Figure 10:
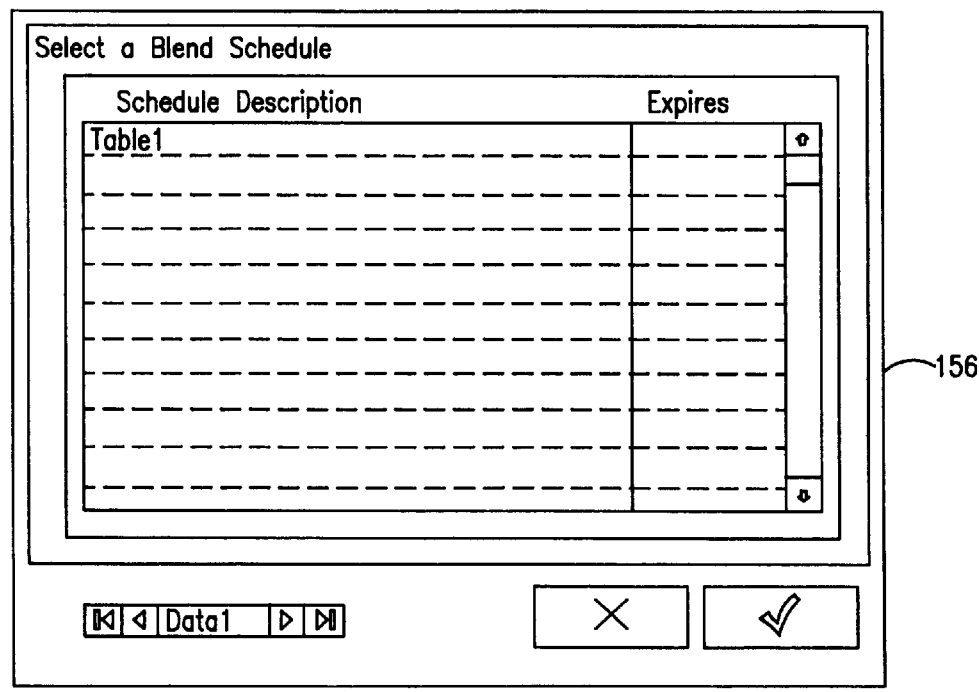
FIG. 10 illustrates a window for inputting schedules for blends.

As illustrated in FIG. 2, a user can enter or modify schedules using a scheduling command in step 52, and the electronic production system 10 performs scheduling by starting the scheduling in step 140 of FIG. 8. In FIG. 8, the electronic production system 10 then generates a scheduling window in step 142 corresponding to the selected scheduling command. For example, in response to receiving a NEW SCHEDULE command, the electronic production system 10 generates in step 144 a NEW SCHEDULE window 152, as in FIG. 9, to receive input data identifying the processes to be performed and the expiration or termination date of the process. Such scheduling permits determination by the accounting/facility management system 26 of the entire current and future inventory and production value of the inventory being produced. The scheduling also implements a built-in inventory cycle count system in which cycles of production schedules are performed.

Other processes involve combining components, such as the blending of chemicals, with such processes dependent upon the availability of the constituent components. The electronic production system 10 and method permit the scheduling of blends by generating in step 146 a BLEND SCHEDULE window 156, as in FIG. 10, in response to a BLEND SCHEDULE command. Through the BLEND SCHEDULE window 156, the user may input blend processes and expiration dates.

In other situations, scheduled processes are inactive; for example, for production reasons including unavailable components of a blend or combination from another process. Also, maintenance and external factors such as acts of nature may cause or require inactivation of scheduled processes. In response to a DOWNTIME SCHEDULE command, the electronic production system 10 generates, in step 148, a DOWNTIME SCHEDULE window 158, shown in FIG. 11. Through the DOWNTIME SCHEDULE window 148, the user may select a schedule to have downtime status until reactivation, with the reasons for the downtime being specified using a sub-category input field 160.

Figures 11, 12:
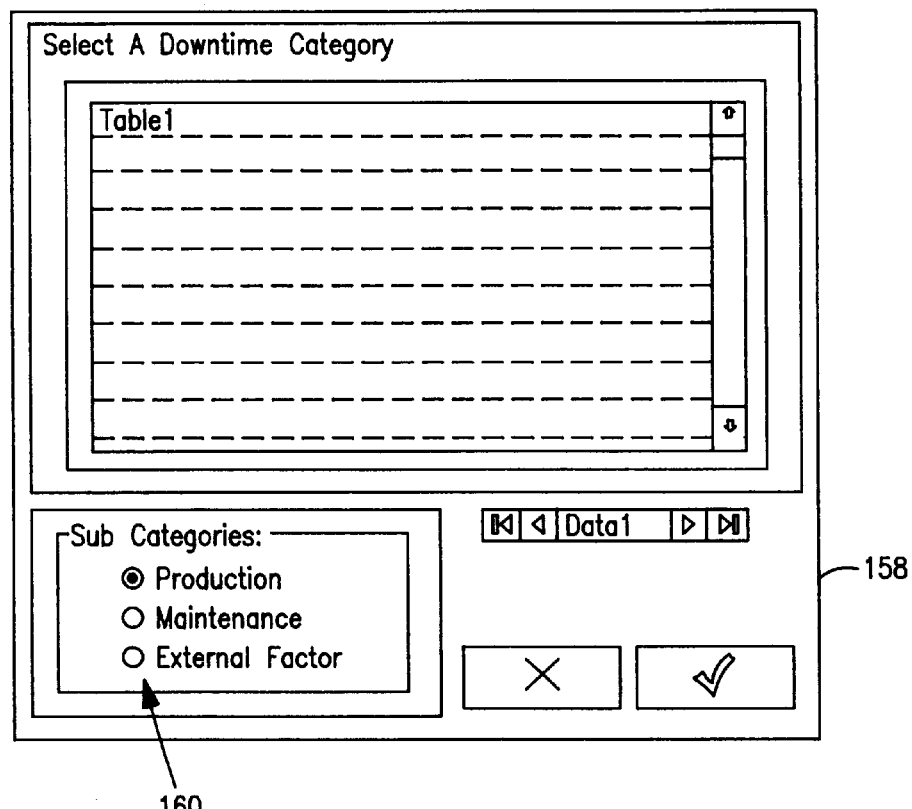
FIG. 11 illustrates a window for inputting downtime schedules.
FIG. 12 illustrates a window for inputting end times for schedules and downtime.

After entering a schedule or a downtime using the scheduling windows 154–160, the end time of a current schedule or a current downtime may be specified using an end time window 162 shown in FIG. 12, which the electronic production system 10 generates upon the approval of a schedule or a downtime by a user; i.e. by clicking the checkmark icon in the schedule windows. The entered schedules are then transmitted to the memory 14 for storage and implementation.

Upon receiving the schedule data from the user in step 150, the electronic production system 10 implements the schedule in step 152 by, for example, issuing daily or weekly notices to supervisors and technicians to institute the specified schedule of production. Since the electronic production system 10 interacts with the other systems of the facility, such as the accounting/facility management system 26, production in the facility and changes in production are maintained and tracked accurately and efficiently.

When viewing the VIEW_PROCESS window 110 in FIG. 7, the user may desire to change the readings of the tanks; for example, the user may suspect that some of the readings are faulty due to sensor malfunction, mismeasurement of the contents by manual sampling, etc.

To alter the readings for a specific tank or process, a user may enter a CHANGE_READINGS command, which may be implemented by clicking a corresponding icon such as the tank icon 120 in FIG. 7. Upon receiving the CHANGE_READINGS command in step 54 in FIG. 2, the command is performed according to the steps in FIG. 13, in reference to FIG. 14.

Figure 13:
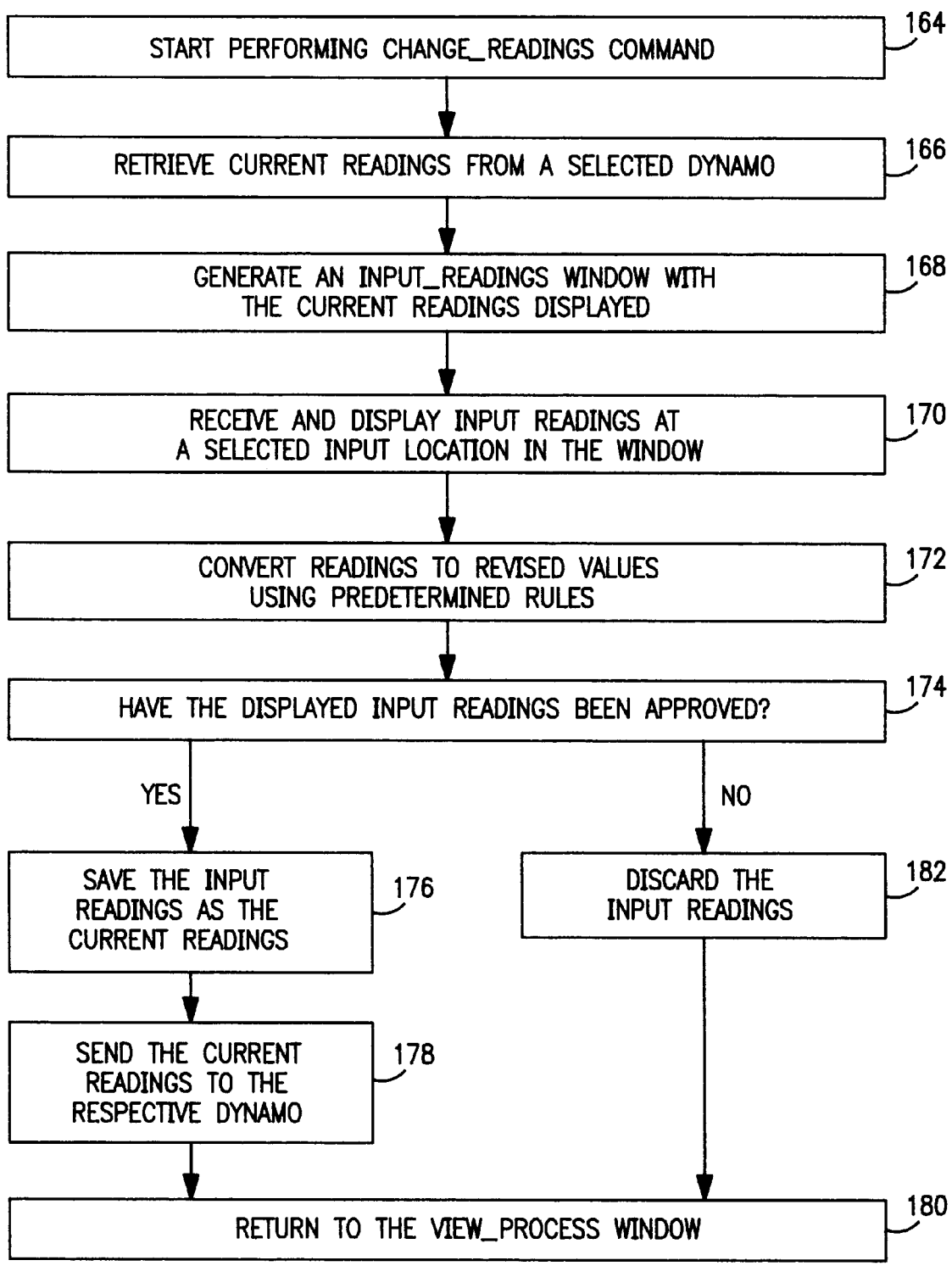
FIG. 13 is a flowchart for changing readings.
Figure 14:
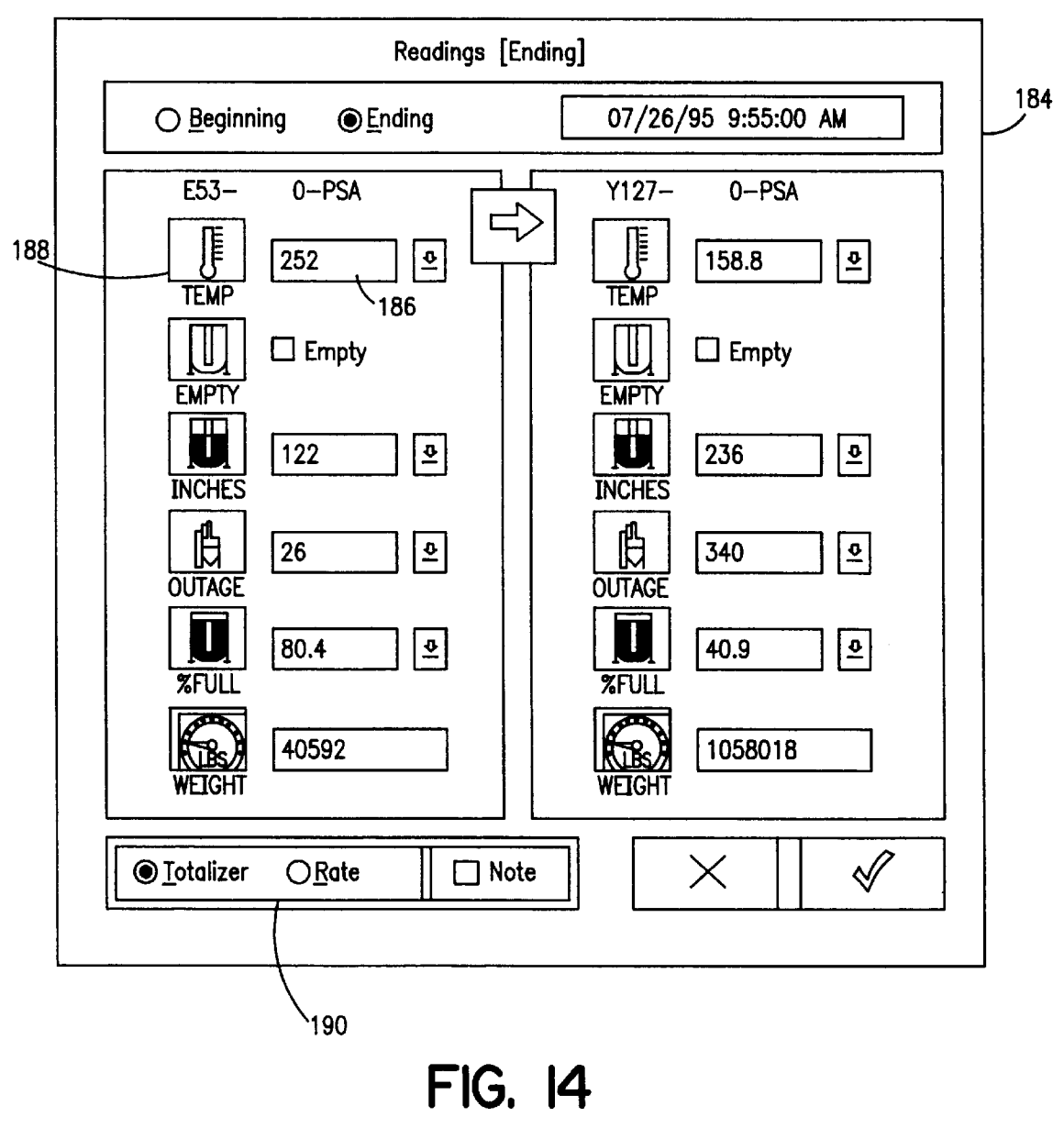

As shown in FIG. 13, the electronic production system 10 starts performing the CHANGE_READINGS command in step 164, retrieves current readings of, for example, the selected tank in step 166, and generates in step 168 a CHANGE_READINGS window 184, as shown in FIG. 14 for simplified data capture using intuitive data screens which are easy to use. The selected tank designation, such as E53 with its contents being 0-PSA, and the current readings associated with the tank are displayed in data fields next to corresponding icons and/or indicia; for example, the temperature is displayed in an input field 186 substantially adjacent a temperature icon 188 and/or indicia such as "TEMP".

The electronic production system 10 then receives input data from the user through a keyboard or a scrollable input value menu in step 170, and the electronic production system 10 also displays the input values at selected locations according to the position of a cursor using, for example, a mouse or a tab key on the keyboard.

Upon receiving the input values as revised values in at least one input field to modify the values therein as currently displayed values, the electronic production system 10 automatically converts the data in the unmodified fields in step 172 to be additional revised values currently displayed in their respective fields. If the user indicates that the tank is empty by clicking an open box next to an EMPTY icon or indica, the open box has an "X" displayed to toggle a flag indicating that the tank is empty, and the values for inches, percent full, and weight are changed to zero.

If the tank is not empty, the user may change the outage; i.e. a rate of output of the contents from the tank. The user may also change the value of inches of the surface of the contents from the bottom of the tank, change the percentage full, and/or change the weight. Changing any one value of inches, percent, or weight automatically changes the others, since the electronic production system 10 recalculates the other values from the input value using predetermined conversion rules and a database of conversion values and formulae stored in memory 14.

The CHANGE_READINGS window may also provide a rate input region 190 for specifying, using the mouse or other input devices, the rate and manner of obtaining the rate of flow between tanks. By toggling the input region adjacent the "Rate" indicia, the user is then prompted to input a specific rate of transfer of chemicals from one tank to another. By toggling the input region adjacent the "Totalizer" indicia, the user may instruct the electronic production system 10 to use a totalizer device, such as a sensor associated with a connection between tanks, which measures the rate of transfer of pounds of chemicals per unit time passing through the connection between tanks. The specified rate and the totalizer may thus provide improved accuracy in tracking the process.

As shown in FIG. 14, the user may also specify whether the readings are readings at a beginning of a process or at the end of a process. The user may also indicate the flow of the contents from one tank to another. The electronic production system 10 allows the user to input values until the currently displayed values are approved or cancelled as determined in step 174. If the currently displayed values are approved, they are saved in step 176 as the current readings for the tank and its associated dynamo. By saving the values, the electronic production system 10 logs the beginning or ending of measured, calculated, or estimated readings, and the dynamo receives the readings in step 178 for further processing.

For example, upon a revision of the percentage capacity to a higher value, the dynamo may replace the currently displayed icon of the corresponding tank with an icon indicating a higher capacity. The electronic production system 10 then returns in step 180 to the VIEW_PROCESS window 110 in FIG. 7 for further user input. Accordingly, if the readings are manually modified through the CHANGE_READINGS window 184, the current readings, being manually input, are displayed in black instead of, for example, green, as the manual input overrides the automatic readings of the electronic sensors.

In addition, the logging of values by the electronic production system 10 is sent to the accounting/facility management system 26 which uses the current values, including revised values, to track production. For example, the amount of a chemical produced in pounds by a given process may then be costed as inventory.

If the currently displayed values are not approved in step 174, the electronic production system 10 discards the currently displayed values in step 182 and leaves as unchanged the readings prior to the use of the CHANGE_READINGS window 182. The electronic production system 10 returns in step 180 to the VIEW_PROCESS window 110.

In revising the readings, a user of the electronic production system 10 may adjust the electronic sensors, for example, with the assistance of other technicians at or near the electronic sensors. In addition, the electronic production system 10 allows novices to train and to become familiar with the facility and the various processes involved.

While the disclosed electronic production system and method have been particularly shown and described with reference to the preferred embodiments, it is understood by those skilled in the art that various modifications in form and detail may be made therein without departing from the scope and spirit of the invention. For example, the illustrative embodiments have been shown in reference to a chemical plant. It is understood that the disclosed electronic production system may be applied to other automated production systems, such as automobile plants; warehouse inventory; loading and unloading, and dispatching systems; semiconductor wafer and chip fabrication and processing; and shipping.

In addition, such an electronic production system may be used with bar coding systems for inventory monitoring, with connections to other distribution control systems, and with isolated flow meters remotely situated from central facilities. The drumming and/or "bagging" of data may also be performed, and quality integration of systems with the disclosed electronic production system may be implemented. Accordingly, modifications such as those suggested above, but not limited thereto, are to be considered within the scope of the invention.

What is claimed is:

1. An electronic production system for monitoring and controlling production in connection with a facility, the system comprising:

means for collecting production data, the production data collected being associated with a plurality of processes being performed in connection with the facility;

means for processing the production data, the processing means being responsive to the production data collecting means and having data storage means associated therewith, the processing means storing at least portions of the production data received from the production data collecting means in the data storage means, the processing means dynamically updating the production data received from the production data collection means in response to the plurality of processes of the facility, and the processing means responding to commands input by a system user;

means for generating records of event occurrences, the event records generating means being responsive to the processing means and the event occurrences being associated with the plurality of processes of the facility; and means for the system user to interface with the electronic production system, the user interface means being responsive to the processing means and permitting the system user to visually monitor and, by inputting commands, to substantially control the plurality of processes of the facility.

2. The system of claim 1, wherein the production data collecting means further includes a plurality of electronic sensors.

3. The system of claim 1, wherein the production data collecting means further includes means for manually providing production data.

4. The system of claim 3, wherein the manual production data provision means further includes means for manually providing an estimate of the production data.

5. The system of claim 1, wherein the production data collecting means further includes means for formatting the production data.

6. The system of claim 1, wherein the processing means generates color codes associated with portions of the production data.

7. The system of claim 6, wherein the user interface means displays at least a portion of the production data in a predetermined color corresponding to the color code associated with that portion of the production data.

8. The system of claim 1, wherein the user interface means displays a layout associated with the facility.

9. The system of claim 8, wherein the layout contains regions and further wherein certain of the regions correspond to areas where certain of the plurality of processes are being conducted.

10. The system of claim 1, wherein the user interface means displays at least one graphic representation corresponding to at least one of the processes of the facility.

11. The system of claim 10, wherein the user interface means displays information substantially in the vicinity of the at least one graphic representation, the information relating to the at least one process corresponding to the at least one graphic representation.

12. The system of claim 11, wherein the processing means dynamically updates the at least one graphic representation and the information in automatic response to the production data.

13. The system of claim 11, wherein the processing means dynamically updates the at least one graphic representation and the information in response to selected inputs provided by the system user via the user interface means.

14. The system of claim 1, further comprising means for controlling the schedule of at least one of the plurality of processes of the facility in response to a selected scheduling command input by the system user.

15. The system of claim 1, wherein the processing means is operatively coupled to an accounting/facility management system for storing production and inventory histories in response to the event occurrence records and the production data.

16. The system of claim 1, wherein the processing means is operatively coupled to facility process-related applications.

17. An electronic production method for monitoring and controlling production in connection with a facility, the method comprising the steps of:

(a) collecting production data, the production data collected being associated with a plurality of processes being performed in connection with the facility;

(b) processing the production data;

(c) storing at least portions of the production data;

(d) dynamically updating the production data in response to the plurality of processes of the facility;

(e) responding to commands input by a system user;

(f) generating records of event occurrences, the event occurrences being associated with the plurality of processes of the facility; and (g) permitting the system user to visually monitor and, by inputting commands, to substantially control the plurality of processes of the facility.

18. The method of claim 17, wherein the processing step further includes generating color codes associated with portions of the production data.

19. The method of claim 18, further comprising the step of displaying at least a portion of the production data in a predetermined color corresponding to the color code associated with that portion of the production data.

20. The method of claim 17, further comprising the step of displaying a layout associated with the facility.

21. The method of claim 20, wherein the layout contains regions and further wherein certain of the regions correspond to areas where certain of the plurality of processes are being conducted.

22. The method of claim 17, further comprising the step of displaying at least one graphic representation corresponding to at least one of the processes of the facility.

23. The method of claim 22, further comprising the step of displaying information substantially in the vicinity of the at least one graphic representation, the information relating to the at least one process corresponding to the at least one graphic representation.

24. The method of claim 23, wherein the processing step further includes the step of dynamically updating the at least one graphic representation and the information in automatic response to the production data.

25. The method of claim 23, wherein the processing step further includes dynamically updating the at least one graphic representation and the information in response to selected inputs provided by the system user.

26. The method of claim 17, further comprising the step of controlling the schedule of at least one of the plurality of processes of the facility in response to a selected scheduling command input by the system user.

* * * * *